US007612471B2

(12) United States Patent
Schasfoort

(10) Patent No.: US 7,612,471 B2
(45) **Date of Patent: *Nov. 3, 2009**

(54) HYBRID ELECTRICAL SWITCHING DEVICE

(75) Inventor: Petrus Johannes Plechelmus Schasfoort, Oldenzaal (NL)

(73) Assignee: Eaton Electric N.V., Hengelo (NL)

( * ) Notice: Subject to any disclaimer, the term of this patent is extended or adjusted under 35 U.S.C. 154(b) by 0 days.

This patent is subject to a terminal disclaimer.

(21) Appl. No.: 11/971,497

(22) Filed: Jan. 9, 2008

(65) Prior Publication Data

US 2008/0129124 A1 Jun. 5, 2008

Related U.S. Application Data

(63) Continuation of application No. 10/433,462, filed as application No. PCT/NL01/00881 on Dec. 4, 2001, now Pat. No. 7,339,288.

(30) Foreign Application Priority Data

Dec. 4, 2000 (NL) .................................... 1016791

(51) Int. Cl.
*H01H 47/32* (2006.01)
*H01H 33/59* (2006.01)
*H02H 3/00* (2006.01)

(52) U.S. Cl. ................... 307/132 E; 307/113; 307/131; 307/139; 361/3; 361/5; 361/8

(58) Field of Classification Search .............. 307/132 E, 307/113, 131, 139
See application file for complete search history.

(56) References Cited

U.S. PATENT DOCUMENTS

| | | | | |
|---|---|---|---|---|
| 3,484,623 | A | 12/1969 | Cain | |
| 4,466,038 | A * | 8/1984 | Robertson | 361/8 |
| 4,876,498 | A | 10/1989 | Luchaco et al. | |
| 5,053,907 | A | 10/1991 | Nishi et al. | |
| 5,699,218 | A * | 12/1997 | Kadah | 361/13 |
| 5,790,354 | A | 8/1998 | Altiti et al. | |
| 5,818,710 | A | 10/1998 | LeVan | |
| 5,953,189 | A | 9/1999 | Abot et al. | |
| 6,046,899 | A * | 4/2000 | Dougherty | 361/173 |
| 6,347,024 | B1 | 2/2002 | Blain et al. | |
| 6,621,668 | B1 | 9/2003 | Sare | |
| 7,339,288 | B2 * | 3/2008 | Schasfoort | 307/132 E |

FOREIGN PATENT DOCUMENTS

| | | |
|---|---|---|
| EP | 0 806 781 | 11/1997 |
| FR | 2 772 975 | 6/1999 |
| GB | 2 284 100 | 5/1995 |
| JP | 01 313817 | 12/1989 |

* cited by examiner

*Primary Examiner*—Albert W Paladini
*Assistant Examiner*—Hal I Kaplan
(74) *Attorney, Agent, or Firm*—Oblon, Spivak, McClelland, Maier & Neustadt, L.L.P.

(57) ABSTRACT

The invention relates to a hybrid electrical switching device, comprising an electromechanical relay including a mechanical switching element to be operated by an electrical coil, and a main semiconductor switching element including a control input and a current conduction path which is connected in parallel with the mechanical switching element for energizing an electric load. The main semiconductor switching element is of the type that ceases to conduct when a current through the current conduction path thereof drops below a threshold value. The circuit furthermore comprises an auxiliary semiconductor switching element including a control input and a current conduction path which is connected for controlling the main semiconductor switching element.

4 Claims, 3 Drawing Sheets

HYBRID ELECTRICAL SWITCHING DEVICE

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC or REFERENCE TO A "MICROFICHE APPENDIX"

Not applicable

BACKGROUND OF THE INVENTION

1. Field of the Invention

The invention relates to a hybrid electrical switching device, comprising an electromechanical relay with a by means of an electrical coil operational mechanical switching element and a main semiconductor switching element with a control input and a parallel with the mechanical switching element connected current conduction path.

2. Description of Related Art

A device of this kind is known from U.S. Pat. No. 5,790,354.

The term hybrid electrical switching device is derived from the combination of a mechanical switching element and a semiconductor switching element.

The known switching device operates such that when the mechanical relay is operated, the parallel to the mechanical switching element connected semiconductor switching element is simultaneously brought in its conducting state. Since the semiconductor switching element is faster in its conducting state than the mechanical switching element, the electric load being switched by the switching device is switched on faster as compared to a similar electromechanical relay without a parallel-connected semiconductor switching element. In other words, the semiconductor switching element eliminates the influence of the pull-in or switch-on delay of the electromechanical relay.

By placing the semiconductor switching element in its conducting state not only upon switching on, but also upon switching off of the mechanical relay, damaging of the contacts of the mechanical switching element caused by arcing and sparking is reduced, which furthermore effects a significant reduction of the power dissipation of the switching device as a whole.

However, the known hybrid electrical switching device has a number of inherent drawbacks.

In the case of an insufficiently conducting mechanical switching element, for example due to ageing and/or fouling of the switching contacts thereof, but also in the case of failure of the mechanical switching element when a load is switched on, a part or even the entire load current will be able to flow through the semiconductor switching element for a relatively long period of time. In order to prevent the semiconductor switching element from being damaged, it must be dimensioned sufficiently "heavy". That is, at least equal to the maximum load current of the electric load to be switched with the switching device.

The known switching device further requires a fairly extensive control circuit, in which the semiconductor switching element furthermore needs to be of an optically controlled type. Since the coil of the mechanical relay is connected in series with a part of the control circuit, this switching device is not naturally suitable for controlling electromechanical relays with coils suitable for usual voltages as they are used in electrical installations for households and the like, i.e. with a typical voltage of 230 V.

BRIEF SUMMARY OF THE INVENTION

It is therefore an object of the invention to provide a hybrid switching device which is suitable for switching power consumers in electrical low-voltage supply networks with an inherent protection against damage to the semiconductor switching element in the case of a non-functioning or poorly conducting mechanical switching element and with a relatively simple control circuit built up of a small number of components.

The invention is characterized by an auxiliary semiconductor switching element with a control input and a connected current conduction path for controlling the main semiconductor switching element.

By means of an auxiliary semiconductor switching element according to the invention for switching the main semiconductor switching element on and off in a controlled manner, it can be effectively prevented that the main semiconductor switching element is damaged by the load current of a connected load in the unhoped-for event of failure of the mechanical switching element of the relay when the relay is being switched on.

If the switching device according to the invention is connected to AC voltage, switching can take place on zero crossings of the AC voltage via the auxiliary semiconductor switching element, for subsequently bringing the main semiconductor switching element in its conducting state. By simultaneously operating the electromechanical relay the mechanical switching element will, after the pull-in or switch-on delay of it, close and take over the current through the current conduction path of the main semiconductor switching element. As a result, the current through the main semiconductor switching element will fall below the threshold value at which the main semiconductor switching element ceases to conduct. In the unhoped-for event of failure of the mechanical switching element, the current through the main semiconductor switching element will likewise fall below the threshold value on the next zero crossing after the main semiconductor switching element has been switched on, as a result of which the main semiconductor switching element will cease to conduct. By arranging that the control input of the main semiconductor switching element will no longer be operated by the auxiliary semiconductor switching element from that moment, the current flow through the load is stopped. Consequently, the main semiconductor switching element is only loaded for half a period of the AC voltage, as a result of which insufficient heat to cause damage to the main semiconductor switching element can be developed therein.

When a current through a connected electric load is switched off, the auxiliary semiconductor switching element will be switched on again on a zero crossing of the AC voltage, as a result of which the main semiconductor switching element will conduct again. By simultaneously switching off the electromechanical relay, the current through the mechanical switching element will, upon opening thereof, be taken over by the main semiconductor switching element. Definite switching off of the current will take place then, when the current through the main semiconductor switching element drops below the threshold value at which the main semiconductor switching element ceases to conduct. Also in this case it will be seen that the main semiconductor switching element will be operated for only a part of half a period of the AC voltage.

Since the main semiconductor switching element can be brought into and out of its conducting state in a controlled manner by means of the circuit according to the invention, the semiconductor switching element need not to be dimensioned heavy enough to withstand the maximum load current of the switching device for a shorter or longer period of time. It will be understood that this is advantageous, both with regard to the overall cost of the switching device and with regard to the volume of the circuit, which makes it quite suitable for miniaturisation.

In connection with this miniaturisation aspect, another embodiment of the switching device according to the invention has the control input of the main semiconductor switching element connected to a voltage divider circuit, which is connected in series with the current conduction path of the auxiliary semiconductor switching element. The voltage divider circuit can be simply made up of a first and a second series-connected resistor, to the junction of which the control input of the main semiconductor switching element is connected.

The use of a bistable relay according to another embodiment of the invention readily makes it possible to combine the switching thereof with the control of the auxiliary semiconductor switching element, so that switching on and off of the mechanical switching element and the main semiconductor switching element that is connected in parallel therewith can be realised in a synchronized manner.

The bistable relay may be monopolar or a bipolar type of relay. Monopolar bistable relays have this characteristic that they switch independently of the polarity of the applied energizing voltage. Bipolar bistable relays switch to the one or the other stable position in dependence on the polarity of the applied energizing voltage.

In the preferred embodiment of the switching device according to the invention, the coil of the electromechanical relay is connected in series with the current conduction path of the auxiliary semiconductor switching element. This embodiment is suitable for directly controlling electromechanical relays with so-called mains voltage coils, i.e. coils which can be connected directly to the electrical low-voltage supply system. This circuit is of very simple design, and consequently it is suitable for applications in which only little space is available for accommodating the switching elements.

According to yet another embodiment of the switching device according to the invention, it is also possible, if desired, to use a monostable electromechanical relay whose mechanical switching element occupies a stable position in the non-conducting state thereof, wherein the relay coil is connected in series with the current conduction path of a third semiconductor switching element, such as a transistor. Preferably, the control input of the transistor is connected to the control input of the auxiliary semiconductor switching element for switching purposes, so as to enable synchronised control of both the main semiconductor switching element and the monostable relay.

In a switching cycle for switching an electric load on and off by means of the hybrid electrical switching device according to the invention, comprising a monopolar bistable electromechanical relay, wherein the auxiliary semiconductor switching element is of the type which ceases to conduct when a current through the current conduction path thereof drops below a threshold value, and wherein the switching device is connected to AC voltage, a first control pulse is supplied to the control input of the auxiliary semiconductor switching element on a first zero crossing of the AC voltage for bringing the auxiliary semiconductor switching element in its conducting state, after which a second control pulse is supplied to the control input of the auxiliary semiconductor switching element on a selected second zero crossing of the AC voltage following the first zero crossing for bringing the auxiliary semiconductor switching element in its conducting state again.

In yet another switching cycle for controlling the hybrid electrical switching device according to the invention for switching a connected electric load on and off, comprising a bipolar bistable electromechanical relay, wherein the auxiliary semiconductor switching element is of the type which ceases to conduct when a current through the current conduction path thereof drops below a threshold value and wherein the switching device is connected to AC voltage, subsequently on a first zero crossing of the AC voltage, following which the AC voltage has a predetermined first polarity, a first control pulse is supplied to the control input of the auxiliary semiconductor switching element for bringing the auxiliary semiconductor switching element in its conducting state, after which on a selected second zero crossing of the AC voltage following the first zero crossing, whereupon the AC voltage assumes a second polarity opposed to the first polarity, a second control pulse is supplied to the control input of the auxiliary semiconductor switching element so as to cause the auxiliary semiconductor switching element to conduct again.

Bipolar bistable electromechanical relays have this advantage that the stable switching position thereof is determined by the polarity that the applied AC voltage assumes upon application of a control pulse. That is, the application of a control pulse followed by, for example, a positive polarity of the AC voltage will at all times lead to the electromechanical relay being switched on, whilst the supply of a control pulse in response to which the AC voltage assumes a negative polarity will at all times lead to the electromechanical relay being switched off.

As a result of the short operating period of the relay coil, the resistors connected in series with the relay coil that may be used will hardly heat up, which makes it possible to use relatively low-capacity resistors having small physical dimensions. Furthermore, this makes it possible to use low-voltage relay coils comprising a series resistor, because the energizing current of the relay will only pass through the resistor for a brief period of time, so that the resistor need not have a large capacity or, in other words, may be small in size. When a resistor-voltage divider connected in series with the auxiliary semiconductor switching element is used, low-capacity resistors having small physical dimensions can be used, in view of the relatively short energizing time of the auxiliary semiconductor switching element.

Yet another switching cycle for controlling the hybrid electrical switching device according to the invention for switching on and off a connected electric load, wherein the auxiliary semiconductor switching element is of the type which ceases to conduct when a current through the current conduction path thereof drops below a threshold value and the electromechanical relay is a monostable relay whose control circuit is connected to DC voltage, and wherein the rest of the switching device is connected to AC voltage, comprises a first control pulse supplied to the control input of the auxiliary semiconductor switching element for bringing the element in the conducting state on a first zero crossing of the AC voltage supply, wherein the coil of the electromechanical relay is simultaneously energized via the control circuit for bringing the mechanical switching element thereof in its conducting state, and the supply of a second control pulse to the control input of the auxiliary semiconductor switching element on a second zero crossing of the AC voltage following the first zero crossing for the purpose of bringing the auxiliary semiconductor switching element in its conducting state, wherein the energizing of the coil of the electromechanical relay is at the same time stopped via the control circuit for the purpose of bringing the mechanical switching element thereof in its stable, non-conducting state.

This manner of controlling the switching device according to the invention has a threefold effect. Firstly, the influence of the switch-on delay of the mechanical relay on the switching on of a connected electric load is reduced significantly on account of the fact that the main semiconductor switching element reaches its conducting state almost immediately after the first control pulse, as a result of which the connected electric load is energized, in which the occurrence of the so-called “inrush-current” effect is effectively prevented by having the switching take place on a zero crossing of the AC voltage.

Secondly, since the main semiconductor switching element ceases to conduct on the next zero crossing of the AC voltage, i.e. in the case of, for example, a 50 Hz AC voltage already after 10 msec, the main semiconductor switching element is effectively prevented from being damaged by the load current of a connected load in the unhoped-for event of the mechanical switching element failing upon being switched on.

Thirdly, due to the fact that the main semiconductor switching element is switched off relatively quickly, an oxide skin that may be present on the switching contacts of the mechanical switching element will burn off before the mechanical switching element has definitively closed the current path to the load. In this way, the aforesaid drawbacks of the prior art regarding poorly or insufficiently conducting mechanical switching contacts are effectively prevented.

Since the electromechanical relay is controlled synchronously with the auxiliary semiconductor switching element, the switch-off procedure will take place analogously to the above-described switch-on procedure, in which the occurrence of arcing and sparking when the mechanical switching element is switched off is prevented on account of the fact that switching takes place on a zero crossing.

Since the auxiliary semiconductor switching element ceases to conduct on the next zero crossing of the AC voltage, as a result of which the control of the main semiconductor switching element drops out, the latter will cease to conduct again on the next zero crossing, that is, when the current through the main semiconductor switching element drops below the threshold value at which the main semiconductor switching element ceases to conduct. That is, an induction voltage through the main semiconductor switching element is effectively suppressed after minimally 10 ms and maximally 20 msec already in the case of an AC voltage of 50 Hz, for example, because the main semiconductor switching element takes over the load current during the sudden current interruption of the mechanical switching element, until the load current drops below the threshold value of the main semiconductor switching element.

Since the hybrid electrical switching device according to the invention requires only a handful of simple components, which by no means need to be dimensioned to withstand relatively large currents, the switching device according to the invention is particularly suitable for applications in which miniaturisation, reliability and safety are of major importance.

Consequently, the invention provides an electrical connecting device for removably connecting an electric load, comprising a hybrid switching device as set forth in the above, which is connected such that the mechanical switching element is connected in series with a connected electric load. In particular, the invention comprises an electrical connecting device in the form of a so-called wall socket, in particular a wall socket for use in electricity networks, such as low-voltage supply systems for household appliances and the like.

By not energizing the electromechanical relay during the switching of the auxiliary semiconductor switching element and the main semiconductor switching element, i.e. by maintaining the electrical switching element thereof in the switched-off, non-conducting state, the switching device according to the invention can also be used for varying the amount of electrical energy that is supplied to a connected electric load, for example, when the switching device is used as a dimmer for a connected lighting element.

Consequently, the invention also provides an electrical switching device comprising a main semiconductor switching element including a control input and a current conduction path for energizing an electric load, which main semiconductor switching element is of the type that ceases to conduct when a current through the conduction path thereof drops below a threshold value, characterized by an auxiliary semiconductor switching element including a control input and a current conduction path connected for controlling the main semiconductor switching element. This electrical switching device can inter alia be used in an electrical connecting device for detachably connecting an electric load, for the purpose of controlling the amount of electric power that is supplied thereto.

In addition to being suitable for ohmic loads, the hybrid electrical switching device according to the invention is also suitable for switching capacitive as well as inductive loads on and off.

The invention will be explained in more detail hereinafter by means of a preferred embodiment.

BRIEF DESCRIPTION OF THE SEVERAL VIEWS OF THE DRAWING(S)

DETAILED DESCRIPTION OF THE INVENTION

Figure 1:
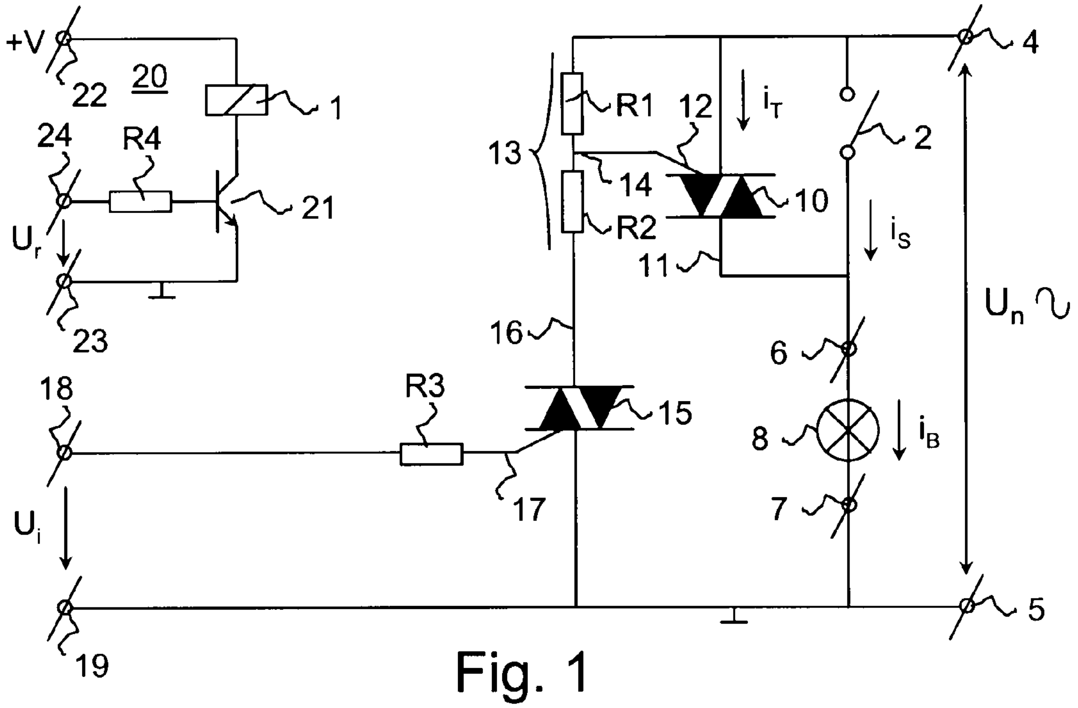
FIG. 1 shows an electric circuit diagram of an embodiment of the hybrid electrical switching device according to the invention.

Although the invention is illustrated by means of a preferred embodiment hereinafter, it should be understood that additions and alterations thereto are possible without departing from the inventive principle underlying the present invention.

Numeral 1 indicates the electrical coil of an electromechanical monostable relay comprising a mechanical switching element 2. The mechanical switching element 2 comprises a stable position, this is the position of the switching element 2 in the non-conducting state, i.e. the switched-off state thereof. The switching element 2 is brought in its conducting state, i.e. switched on, by energizing the coil 1. In the switched-on state of the switching element 2, a current circuit is closed from a first supply terminal 4 to a second supply terminal 5, via intermediate load terminals 6 and 7 and a load 8 connected between the load terminals, which is shown in the form of a lighting element in the diagram by way of example. Those skilled in the art will appreciate that any load can be connected between the load terminals 6 and 7.

A first or main semiconductor switching element 10 comprising a current conduction path 11 is connected between the first supply terminal 4 and the load terminal 6. The current conduction path 11 of the main semiconductor switching element 10 is thus effectively connected in parallel with the switching element 2.

The main semiconductor switching element 10 comprises a control input 12 which is connected to the central branch 14 of a voltage divider circuit 13. In the illustrated embodiment, the voltage divider circuit 13 consists of a series circuit consisting of a first resistor R1 and a second resistor R2.

According to the invention, in series with the voltage divider circuit 13 a second or auxiliary semiconductor switching element 15 is connected by its current conduction path 16. In the illustrated embodiment, the current conduction path 16 of the auxiliary semiconductor switching element 15 is connected between the voltage divider circuit 13 and the second supply terminal 5. The auxiliary semiconductor switching element 15 furthermore includes a control input 17.

In the illustrated embodiment, the control input 17 of the auxiliary semiconductor switching element 15 is connected to a first control input terminal 18 of the switching device via a resistor R3. A second control input terminal 19 of the switching device is connected to the second supply terminal 5.

A control circuit 20 is provided for energizing the coil 1 of the monostable electromechanical relay, which circuit comprises a third semiconductor switching element 21. In the illustrated embodiment, the third semiconductor switching element 21 consists of an NPN transistor, in the main current conduction path of which the coil 1 is connected. The control input of the transistor 21 is connected to an input terminal 24 via a resistor R4. The coil 1 and the main current conduction path of the transistor 21 are connected between supply terminals 22 and 23 for the purpose of applying a DC voltage V for energizing the coil 1. Those skilled in the art will know that the transistor 21 can be brought in its conducting state by presenting a positive voltage $U_r$ between the input terminal 24 and the supply terminal 23 of the control circuit 20.

The first and the second semiconductor switching element 10, 15 are preferably in the form of a triac, but each semiconductor switching element can also be exchanged for two thyristors connected in anti-parallel, whose control inputs are interconnected. The operation and further characteristics of a triac or a thyristor are assumed to be known to those skilled in the art and require no further explanation.

Figure 2:
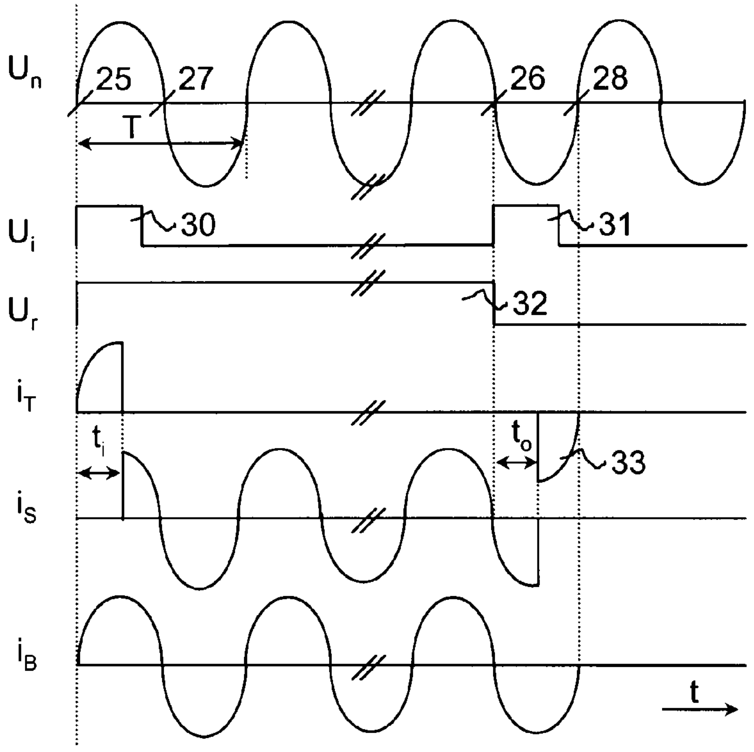
FIGS. 2, 3 and 4 show signal waveforms for illustrating a switching-on and off cycle for controlling an electric load connected to the switching device according to FIG. 1.

The operation of the circuit as described and shown will be illustrated hereinafter on the basis of the graphical signal waveforms as shown in FIG. 2. It is noted that the signal waveform in FIG. 2 is merely illustrative and of a theoretical nature. For this reason, exact values of the amplitudes and switching times are not included in the figures.

$U_n$ represents an AC voltage signal on the first and the second supply terminal 4 and 5 which is sinusoidal in time T, for example an AC voltage of 230 V having a frequency of 50 Hz, as is usual in electrical low-voltage supply systems for household appliances and the like. In the case of an assumed frequency of 50 Hz, the period time T of the sinusoidal AC voltage $U_n$ is 20 msec.

$U_i$ represents a trigger signal supplied on control input terminals 18, 19, comprising a first positive (in relation to the second supply terminal 5) trigger pulse 30, which starts with a first zero crossing 25 of the AC voltage $U_n$.

The trigger signal $U_i$ furthermore comprises a second positive control pulse 31, which coincides with a selected second zero crossing 26 of the AC voltage $U_n$ following the first zero crossing, all this as illustrated in FIG. 2. The operation of the circuit according to the invention is as follows.

A control signal $U_r$, indicated by numeral 32, is applied to the input terminal 24 of the control circuit 20 together with the trigger pulse 30. The control signal 32 brings the transistor 21 in its conducting state, as a result of which more current will flow through coil 1 and the mechanical switching element 2 will be switched on after a certain switch-on or pull-in delay $t_i$. This results in the flow of a current $i_s$, as is indicated in FIG. 1.

The first trigger pulse 30 brings the auxiliary semiconductor switching element 15 in its conducting state. The conduction of the auxiliary semiconductor switching element 15 will be accompanied by a current flow through the voltage divider circuit 13, as a result of which the control input 12 of the main semiconductor switching element 10 will be energised and the main semiconductor switching element will likewise be brought in its conducting state. A current $i_T$ will flow to the load 8 connected to the terminal connecting point 7 via the current conduction path 11 of the main semiconductor switching element 10.

Since the main semiconductor switching element 10 is brought in its conducting state practically simultaneously with the application of the first trigger pulse 30 in the circuit according to the invention, the current $i_B$ will also start to flow practically directly upon application of the first trigger pulse 30. As a result, the switch-on delay of the switching device as a whole is practically eliminated.

When the switching element 2 reaches its conducting state, that is, the moment a current $i_s$ starts to flow, the current through the main semiconductor switching element 10 will fall below the threshold value and the main semiconductor switching element 10 will cease to conduct. All this as illustrated in FIG. 2. The load current $i_B$ will fully flow through the switching element 2 of the electromechanical relay in that situation.

In FIG. 2 it has been assumed that the pull-in or switch-on delay time $t_i$ of the electromechanical relay amounts to less than a half period T of the applied AC voltage $U_n$. As a result, a further trigger pulse on the zero crossing 27 of the AC voltage $U_n$ that follows the zero crossing 25 directly is not required. This will generally be the case for an AC voltage $U_n$ having a frequency of 50 Hz. If the switch-on or pull-in delay time $t_i$ of the electromechanical relay amounts to more than a half period T, it will be apparent that the main semiconductor switching element 10 must be in its conducting state during the next half period or periods.

As the natural delay time of a relay is known, the trigger pulse for the auxiliary semiconductor switching element can be delayed by about 10 ms before the mechanical switching element actually closes. Depending on the variation in the delay time, one or more trigger pulses can be applied.

The procedure for switching off the current $i_B$ through the load 8 is as follows.

On a further zero crossing to be selected, for example the zero crossing 26 following a random number of whole or half periods of the AC voltage $U_n$, a trigger pulse $U_i$, indicated as the trigger pulse 31 in the figure, is supplied to the control input 17 of the auxiliary semiconductor switching element 15 anew. The trigger pulse 31, in combination with the switching-off of the control signal $U_r$ 32, will cause the energizing of the coil 1 to be interrupted.

The trigger pulse 31 will cause the main semiconductor switching element 10 to conduct in the manner such as described in the foregoing with reference to the trigger pulse 30. As a result of the energizing of the coil 1 being stopped, the switching element 2 of the electromechanical relay will be brought in the switched-off state after a certain switch-off or dropout delay $t_0$, as a result of which the current $i_s$ will go to zero. Since the main semiconductor switching element 10 has been brought in its conducting state, the current $i_B$ through the load 8 will be taken over by the main semiconductor switching element 10, that is $i_T=i_B$. This is indicated by numeral 33 in FIG. 2. Since the main semiconductor switching element 10 is of a type that ceases to conduct when the current $i_T$ drops below a threshold value, which is also called cold current in the case of a triac or a thyristor, the main semiconductor switching element 10 will cease to conduct at the first zero crossing 28 of the AC voltage $U_n$, as a result of which no current $i_B$ will flow through the load 8 any more, either. Since the auxiliary semiconductor switching element 15 is no longer driven to full output, the load 8 is effectively switched off.

In this example it has been assumed that the load 8 is an ohmic load. This is not necessary, however. The circuit according to the invention is also suitable for switching off capacitive or inductive loads 8, in which the current through the load is switched off on a zero crossing at all times. In the foregoing it has been assumed that the switch-off or dropout delay time $t_0$ of the electromechanical relay amounts to less than a half period of the connected AC voltage $U_n$ again. If this is not the case, the current $i_T$ through the main semiconductor switching element 10 must be maintained for one or more next half periods by presenting a trigger pulse $U_i$ to the control input 17 of the auxiliary semiconductor switching element 15 each time.

Also in this case it applies that, owing to the delay of the relay, the trigger pulse for the auxiliary semiconductor switching element can be delayed, with one or more trigger pulses being applied in dependence on the variation in the delay.

Since the mechanical switching element 2 takes over the current of the main semiconductor switching element 10 upon switching on, and since the main semiconductor switching element 10 takes over the current through the mechanical switching element 2 upon switching off, there will be no arcing or sparking at the mechanical switching element 2, which has a positive effect on the life of the switching contacts thereof.

Since the main semiconductor switching element 10 is already switched off after the first half period of the AC voltage signal 25, an oxide skin that may be present on the switching contacts of the mechanical switching element 2 will automatically "burn off" upon operation of the mechanical switching element 2. As a result, the contacts will remain in an optimum conducting condition.

Instead of being provided with a monostable electromechanical relay, the switching device according to the invention can also be advantageously provided with a bistable electromechanical relay comprising a switching element including a stable switched-off position and stable switched-on position.

Figure 5:
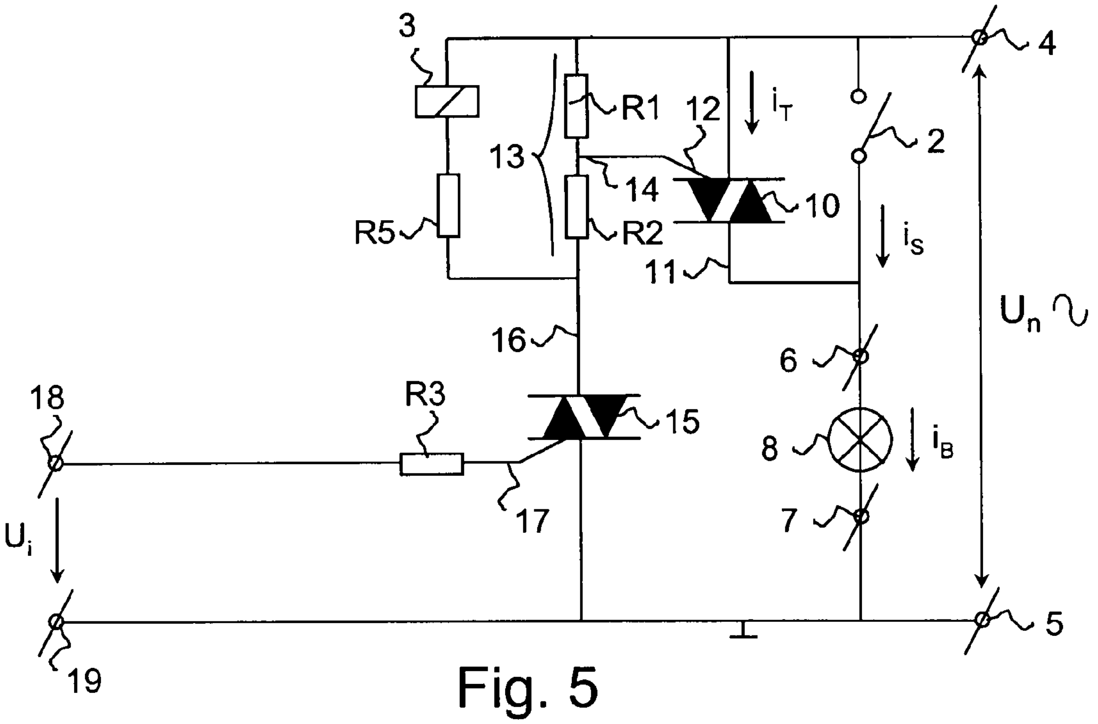
FIG. 5 shows an electric circuit diagram of a preferred embodiment of the hybrid electrical switching device according to the invention.

In FIG. 5, a preferred embodiment of the switching device comprising a bistable relay is illustrated. The coil 3 of the bistable relay is connected in series with the current conduction path 16 of the auxiliary semiconductor switching element 15 via a resistor R5. All this is arranged such that when the auxiliary semiconductor switching element 15 reaches its conducting state, current can flow through the coil 3, as a result of which the switching element 2 of the bistable relay will switch over to another position.

Those skilled in the art will see that the coil 3 of the bistable relay can also be switched on via an intermediate circuit, for example yet another semiconductor switching element, which is controlled via the auxiliary semiconductor switching element 15.

Figure 3:
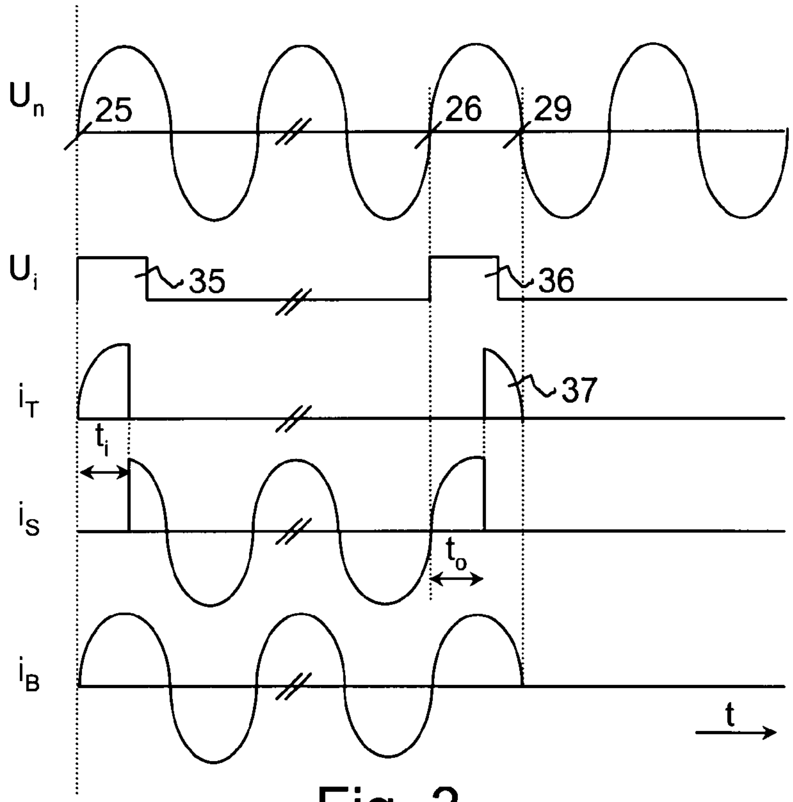

FIG. 3 graphically represents a switching cycle for a so-called monopolar, bistable relay, that is, a bistable relay whose switching element 2 changes over to another position irrespective of the polarity of the current that flows through the coil 3.

By bringing the auxiliary semiconductor switching element 15 in its conducting state by means of a first trigger pulse $U_i$ 35, not only will the current $i_T$ start to flow, but the coil 3 of the bistable relay will be energised at the same time. After the switch-on or pull-in delay time $t_i$ thereof, the switching element 2 will be switched on, as a result of which the current $i_T$ will be taken over by the main semiconductor switching element 10. In FIG. 3, it has been assumed that the first trigger pulse 35 is started on a zero crossing 25 of the AC voltage $U_n$.

The current $i_B$ through the load 8 can be switched off again by presenting a second trigger pulse $U_i$ 36 on a selected further zero crossing 26 following the zero crossing 25. As a result, the auxiliary semiconductor switching element 15 is brought in its conducting state again and current starts to flow through the coil 3 of the bistable relay. As a consequence, the switching element 2 will be switched to its stable, switched off position, albeit after the elapse of the switch-off or dropout delay $t_0$ thereof. Also in this case it obtains that upon interruption of the switching element 2, the current $i_s$ will be taken over by the main semiconductor switching element 10, which is in its conducting state, as is indicated at 37. The main semiconductor switching element 10 will cease to conduct again on the next zero crossing 29 of the AC voltage $U_n$, because the current $i_T$ drops below its threshold value. Also in this case, it has been assumed that the load 8 is an ohmic load, without a phase shift occurring between the voltage and the current thereof.

Since it has been assumed in FIG. 3 that the bistable relay is a monopolar relay, the second trigger pulse 36 can be started on a zero crossing, after which a positive or negative half period of the AC voltage $U_n$ follows.

Figure 4:
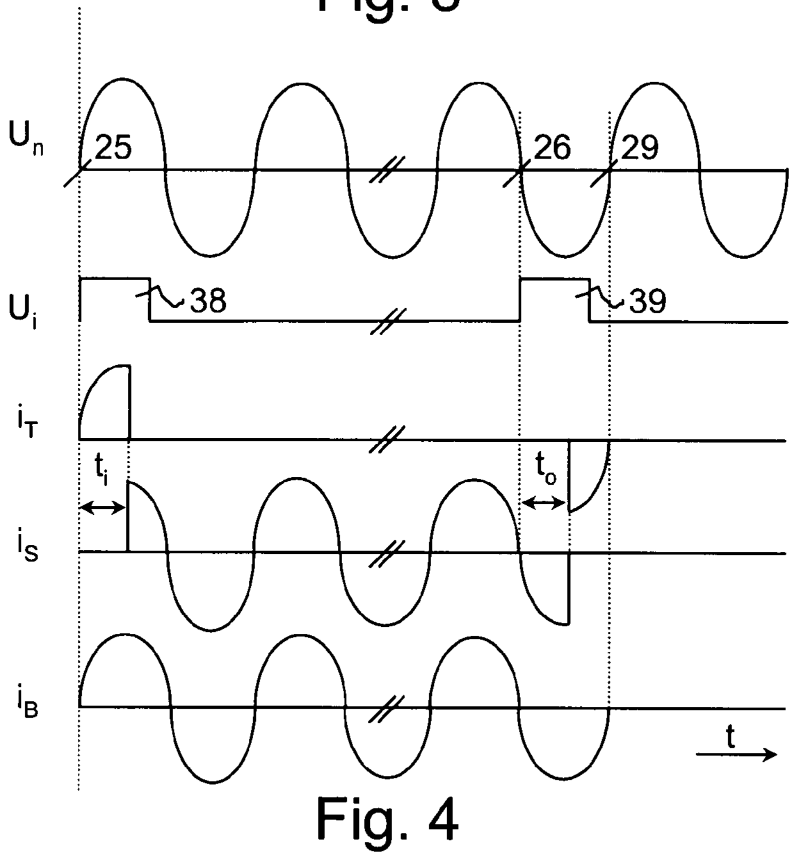

FIG. 4 graphically illustrates a switching cycle that occurs when the bistable relay is a so-called bipolar type relay. A bipolar, bistable electromechanical relay has this characteristic that the switching element 2 thereof only changes over to another position when the current through the coil 3 of the relay flows in a specific direction. In FIG. 4 it has been assumed that the switching element 2 switches on during a positive half period of the AC voltage $U_n$, and that the switching element 2 switches off with a negative half period of the AC voltage $U_n$.

The operation of the circuit comprising a bipolar, bistable relay is in fact identical to the operation of the monopolar, bistable relay as shown in FIG. 3, with this understanding that switching off, that is, the supply of a second trigger pulse 39 to the control input 17 of the auxiliary semiconductor switching element 15, takes place on a zero crossing 26, after which a negative half period of the AC voltage $U_n$ follows.

The advantage of using a bipolar, bistable relay is that the stable state of the mechanical switching element 2 is known implicitly by suitably presenting a control pulse of a specific polarity. That is, in the example as assumed, a trigger pulse 38 during a positive half period of the AC voltage $U_n$ causes the switching element 2 to switch on, whilst a trigger pulse 39 during a negative half period of the AC voltage $U_n$ will at all times cause the switching element 2 to be switched off. In other words, it is not necessary to know or to detect the history, or the current switching state of the switching element 2 for bringing the switching element 2 in a specific stable state.

As a result of the relatively short time during which current flows through the coil of the bistable relay 3, the resistor R5 that is connected in series therewith can be designed as a relatively low-capacity unit, because the resistor will hardly heat up. This makes it possible to keep the physical dimensions of the resistor R5 relatively small. This also applies to the resistors R1 and R2 of the voltage divider 13, both when used with a bistable relay and when used with a monostable relay.

Since the circuit according to the invention requires only a handful of components, which by no means need to have a high-capacity, on account of the method that is used for controlling the circuit, this circuit is particularly suitable for miniaturisation purposes, as a result of which it can be used in electrical connecting devices for detachable connection of an electric load, such as a wall socket for use in, for example, electricity systems for household use, that is, using a usual voltage of 230 V AC voltage.

Although the invention has been explained by means of a preferred embodiment of the circuit in the foregoing, it will be understood by those skilled in the art that additions and modifications thereto are possible without departing from the inventive concept underlying the invention as defined in the appended claims.

The invention claimed is:

1. A hybrid electrical switching device, comprising:

an electromechanical relay including a mechanical switching element to be operated by means of an electrical coil;

a main semiconductor switching element including a main control input and a main current conduction path connected in parallel with the mechanical switching element for energizing an electric load through a current circuit between a first AC supply terminal and a second AC supply terminal, wherein the main semiconductor switching element ceases to conduct when a current through the main current conduction path thereof drops below a threshold value;

an auxiliary semiconductor switching element including an auxiliary control input and an auxiliary current conduction path connected for controlling the main semiconductor switching element, wherein the auxiliary semiconductor switching element is configured to switch to a conducting state in response to a control pulse received at the auxiliary control input, and the auxiliary semiconductor switching element ceases to conduct when a current through the auxiliary current conduction path drops below a threshold value, and the auxiliary control input is separate from an input for the mechanical switching element;

a voltage divider circuit, series-connected with the auxiliary current conduction path between the first AC supply terminal and the second AC supply terminal, and wherein the main control input is connected to a branch of the voltage divider circuit, wherein the electromechanical relay is a bistable relay with a first and a second stable switching position of the mechanical switching element, wherein the electrical coil of the electromechanical relay is connected for directly energizing the electromechanical relay by the auxiliary current conduction path.

2. The hybrid electrical switching device according to claim 1, wherein the electrical coil of the electromechanical relay is connected in series with the auxiliary current conduction path.

3. A method for controlling a hybrid electrical switching device, the method comprising:

providing the hybrid electrical switching device according to claim 1; and providing a bipolar bistable electromechanical relay, wherein the switching device is connected to an AC voltage, wherein a switching cycle for switching on and off the electric load successively comprises, on a first zero crossing of the AC voltage, supplying a first control pulse to the auxiliary control input for bringing the auxiliary semiconductor switching element in its conducting state, and on a selected second zero crossing of the AC voltage following the first zero crossing, supplying a second control pulse to the auxiliary control input for bringing the auxiliary semiconductor switching element in its conducting state.

4. A method for controlling a hybrid electrical switching device, the method comprising:

providing the hybrid electrical switching device according to claim 1; and providing at least one of a monopolar bistable electromechanical relay and a bipolar bistable electromechanical relay, wherein the switching device is connected to an AC voltage, wherein a switching cycle for switching on and off the electric load successively includes on a first zero crossing of the AC voltage, following which said AC voltage has a predetermined first polarity, supplying a first control pulse to the auxiliary control input for bringing the auxiliary semiconductor switching element in its conducting state, and on a selected second zero crossing of the AC voltage following the first zero crossing, following which said AC voltage has a second polarity opposed to the first polarity, supplying a second control pulse to the auxiliary control input for bringing the auxiliary semiconductor switching element in its conducting state.

* * * * *